June 23, 1959  A. D. GOODWIN  2,891,372
COMBINATION KNOCKER AND LIMB SHAKER
Filed Jan. 10, 1958  2 Sheets-Sheet 1
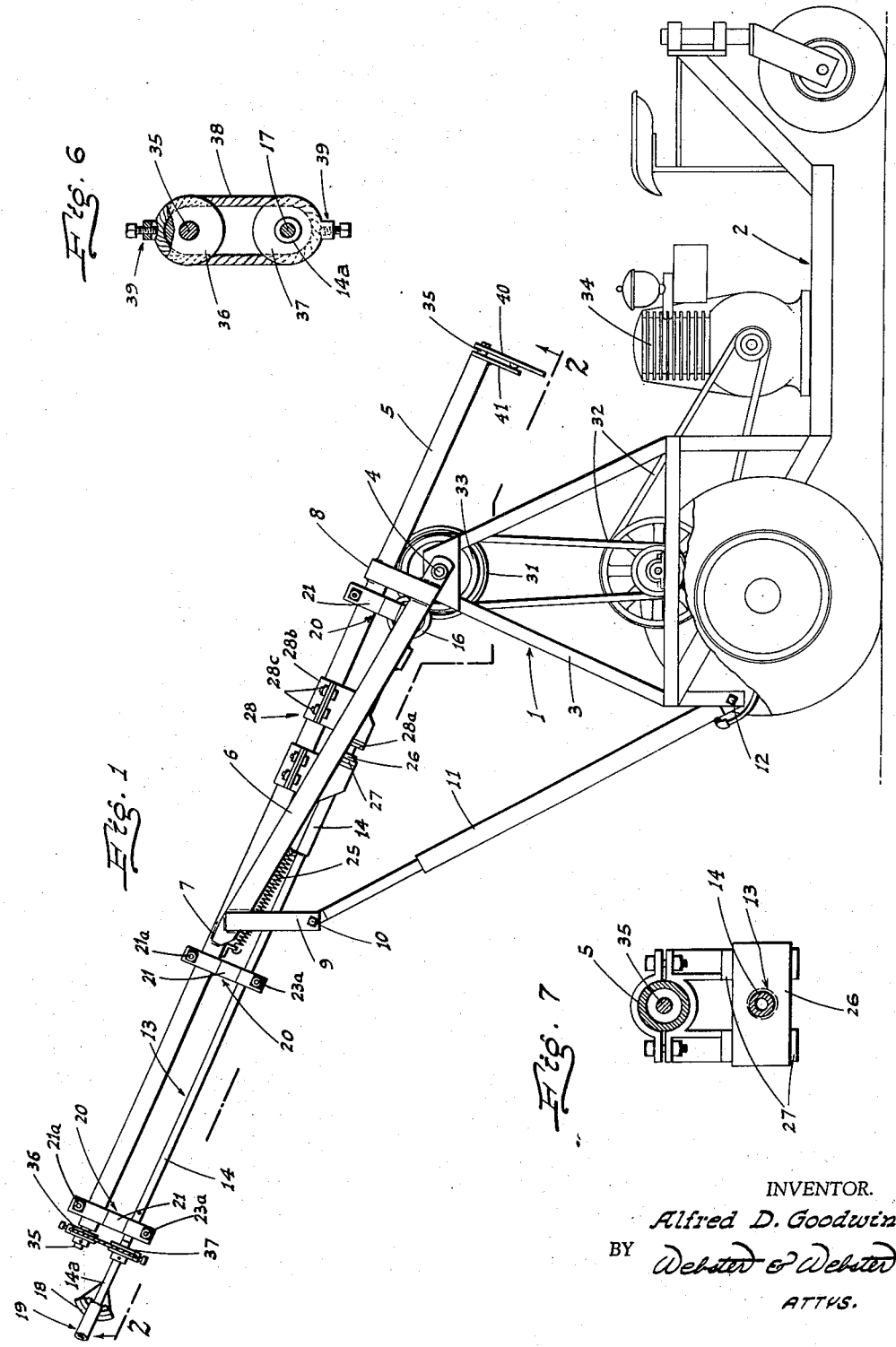
INVENTOR.
Alfred D. Goodwin
BY Webster & Webster
ATTYS.

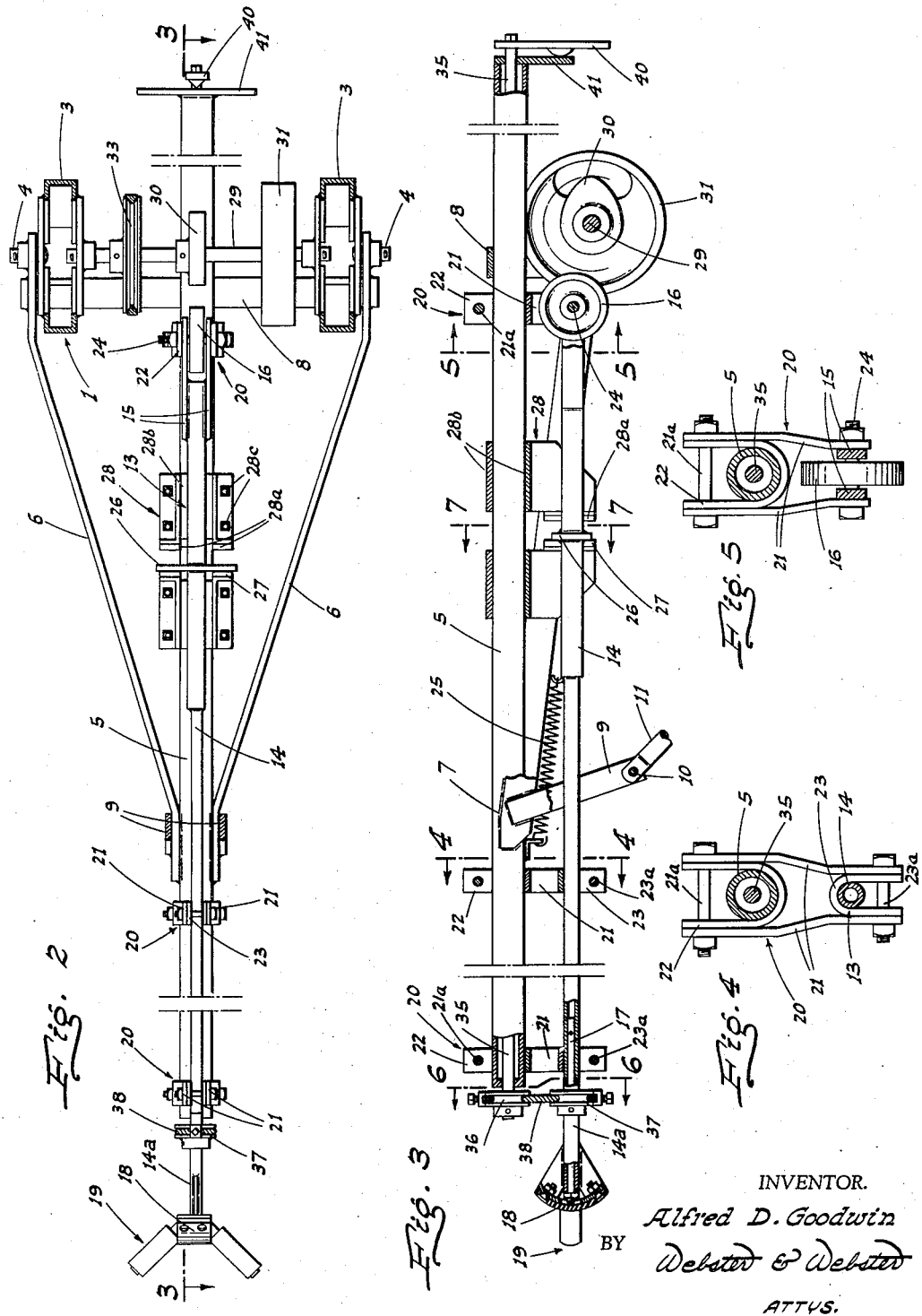

United States Patent Office 2,891,372
Patented June 23, 1959

2,891,372

COMBINATION KNOCKER AND LIMB SHAKER

Alfred D. Goodwin, Manteca, Calif., assignor to A. D. Goodwin & Son, Inc., Manteca, Calif., a corporation of California Application January 10, 1958, Serial No. 708,084

4 Claims. (Cl. 56—328)

This invention relates to tree and limb shaking apparatus for the purpose of knocking or shaking nuts from the trees.

The apparatus is vehicle-mounted and includes a longitudinally reciprocable limb engaging shaker rod, and power driven means to reciprocate the rod. One of the objects of this invention is to arrange the shaker rod in connection with the power means so that no movement will be imparted to the rod unless the outer end of the latter is pressingly engaged with a limb.

Another object is to arrange the reciprocating means for the shaker rod so that a positive blow is given the rod in an advancing or forward direction, while at the same time a rapid shaking action generally is given to the rod.

A further object of the invention is to provide means which enables the length of the stroke movement of the shaker rod to be altered.

The shaker rod at its outer end carries a limb locating and engaging fork, and another object of the invention is to provide means operable from the rear end of the rod for altering the angle of the fork relative to a horizontal plane so as to accommodate the fork to limbs setting at different slants or angles relative to the apparatus.

It is also an object of the invention to provide a practical, reliable, and durable combination knocker and limb shaker, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved shaker, as mounted on a vehicle, with one wheel broken away.

Fig. 2 is an enlarged and fragmentary bottom plan view of the shaker rod and its mounting structure, taken on line 2—2 of Fig. 1.

Fig. 3 is a sectional elevation on line 3—3 of Fig. 2, with parts broken away and shown in section.

Fig. 4 is a fragmentary enlarged cross section of the device on line 4—4 of Fig. 3.

Fig. 5 is a similar view on line 5—5 of Fig. 3.

Fig. 6 is a similar view on line 6—6 of Fig. 3.

Fig. 7 is a similar view on line 7—7 of Fig. 3.

Referring now more particularly to the drawings, and to the characters of reference marked thereon, the improved shaker comprises a relatively stationary supporting frame 1 upstanding from and rigidly mounted on a suitable and preferably self-propelled vehicle 2. The transversely spaced units 3 of this frame support, at their upper end, trunnions 4 which project laterally out and are in axial alinement transversely of the vehicle. A longitudinally and forwardly extending main tubular boom 5 is disposed centrally between the units 3 and is turnably supported from the above the trunnions 4 by means of side arms 6 which are turnable at their rear ends on the trunnions and converge thence to a welded connection 7 with the boom 5 intermediate its ends.

A strap 8 extends between and ties the arms 6 and the boom 5 together adjacent the rear end of said arms. Short arms 9 are rigid with, and depend from, the arms 6 adjacent their forward end, and support a pivot connection 10 for the upper end of a centrally disposed fluid ram 11, the lower end of which is pivoted—as at 12—on the vehicle adjacent the lower end of and between the units 3.

A shaker unit 13 extends forwardly from adjacent the strap 8 to adjacent but beyond the forward end of the main boom, and is disposed under and parallel thereto. This shaker unit comprises a tubular rod 14 on the rear end of which a rearwardly extending yoke 15 is mounted, this yoke supporting a transverse-axis roller 16.

A relatively short extension rod 14a projects forwardly from rod 14, being turnably mounted in connection therewith by a supporting shaft 17 secured in rod 14 and projecting through extension rod 14a in turnable relation (see Fig. 3).

An arcuate cushioned bumper head 18 is secured on and extends across the outer end of the extension rod 14a, and diverging cushioned fingers 19 project forwardly from the rod extension 14a in straddling relation to the head 18; the head 18 and fingers 19 together forming a fork adapted to engage a tree limb in straddling relation.

The shaker unit 13 is supported for longitudinal shaking movement from the main boom 5 at intervals in the length of the shaker unit 13 by means of hangers 20. Each hanger comprises straps 21 which straddle the boom 5 and rod 14 and are pivoted at their upper ends on bolts 21a supported by brackets 22 secured on and upstanding from the boom 5. The straps of the foremost hangers are pivoted at their lower ends on bolts 23a supported by brackets 23 depending from the rod 14, as shown in Fig. 4, while the straps of the rearmost hanger are pivoted directly on the shaft 24 of roller 16, as shown in Fig. 5. The hangers are arranged so that the shaker unit 13 and its roller 16 are close to occupying a position radially of the axial plane of the trunnions 4.

A tension spring 25 is connected to boom 5 and unit 13 and acts to yieldably pull the latter forwardly; forward movement of unit 13 being limited by the engagement of a stop plate 26 secured on rod 14 with stop elements 27 which straddle the rod 14 in front of said plate and which are rigid with and depend from boom 5. See Fig. 7. Rearward movement of the shaker unit 13 is limited by a similar stop unit 28 adjustably mounted on the boom 5 rearwardly of the stop plate 26. The stop unit comprises transversely spaced pads 28a straddling the rod 14 on opposite sides of plate 26, as shown in Fig. 2, and in the path of rearward movement of said plate. These pads depend from and are rigid with a split body 28b adjustably clamped by bolts 28c to the boom 5.

A shaft 29 is mounted on the frame units 3 in axial alinement with trunnions 4 (see Fig. 2) and carries an eccentric single-lobe cam 30 alined with roller 16 and a balanced flywheel 31 to one side of the cam. The stop elements 27 are positioned so that when the stop plate 26 is engaged with the same, the roller is moved ahead clear of the path of the cam, as indicated in Fig. 3. The stroke of the shaker unit 3 is determined by the distance between the stop elements 27 and 28, and this distance may be altered to increase or decrease the length of the stroke—within prescribed limits—by adjusting the stop unit 28 along the boom 5. In any case, when the stop plate 26 is engaged with the stop unit 28, the roller 16 is moved into the path of the cam. Said cam is rotated, at any suitable operating speed, by means of drive connections 32 between a pulley 33 on shaft 29 and an engine 34 on the vehicle 2.

The rod extension 14a and parts thereon may be turned to alter the angle of setting of the fork 19 by the following means:

Alined pulleys 36 and 37 are fixed on the forward end of shaft 35 and on extension 14a, respectively. A laterally flexible belt, such as a rope 38, extends between the pulleys; the rope being clamped to the pulleys at diametrically opposed points thereon when the fork 19 is in a horizontal plane, as shown at 39 in Fig. 6. The other or rear end of the shaft 35 is provided with a radial handle 40 which cooperates with a holding quadrant 41 mounted on the rear end of the boom 5.

In operation, upon the approach of the vehicle into position adjacent a tree to be shaken, the boom 5 and the shaker unit 13 mounted thereon are adjusted so that the fork 19 is at the level desired for engagement with a limb to be shaken. This is of course done by actuating the ram 11. The setting of said fork is also adjusted if necessary by manipulation of handle 40. The vehicle is then advanced until the fork engages the chosen limb, and the shaker rod 14 is forced back against the resistance of spring 25 until the stop plate 26 abuts the rear stop unit 28. During this operation the limb itself will be sprung and placed under tension somewhat.

The roller 16 of the shaker rod is then disposed in the path of the cam 30, so that as the latter rotates, hammer-like knocking blows in a forward direction will be imparted to the limb engaging head 18; the inherent springiness of the limb forcing the shaker rod back whenever the cam leaves the roller, as will be obvious.

The flywheel 31 serves an important function in that it enables the belt-driven shaft 29 to rotate with a constant momentum, so that there is no tendency for said shaft to stall with recurring engagement of the cam 30 thereon with the roller 16.

From the foregoing description it will be readily seen that there has been produced such an apparatus as will substantially fulfill the objects of the invention, as set forth herein.

While this specification sets forth in detail the present and preferred construction of the apparatus, still in practice such deviations therefrom may be resorted to as will not form a departure from the spirit of the invention, as defined by the appended claims.

Having thus described the invention the following is claimed as new and useful, and upon which Letters Patent are desired:

1. A tree-limb shaking apparatus comprising a supporting frame, an elongated boom mounted on the frame, a shaker rod extending along the boom in spaced and parallel relation thereto, means supporting the rod from the boom for longitudinal reciprocating movement, a limb locating and engaging unit on the forward end of the rod, an element on the rear end of the rod, means mounted on the frame and engageable with said element from the rear to impart a forward stroke of limited length to the rod, a stop plate secured on the rod intermediate its ends, a stop element on the boom ahead of and projecting into the path of the plate, and a spring connected between the boom and rod arranged to yieldably advance the rod and hold the stop plate against the stop element.

2. An apparatus, as in claim 1, with a stop unit projecting from the boom rearwardly of the stop plate and projecting into the path of the same, and means on said stop unit mounting the same on the boom for adjustment therealong.

3. A tree-limb shaking apparatus comprising a supporting frame, an elongated boom mounted on the frame, a shaker rod extending along the boom in spaced and parallel relation thereto, means supporting the rod from the boom for longitudinal reciprocating movement, a limb locating and engaging unit on the forward end of the rod, an element on the rear end of the rod, a driven transverse-axis cam mounted on the frame in position to engage said element from the rear when the rod is retracted, and means mounting the boom on the frame for rotation about a transverse axis alined with that of the cam.

4. An apparatus, as in claim 3, in which the frame includes a pair of transversely spaced upright units between which the cam is disposed and from which said cam is turnably supported; said boom mounting means including trunnions on said upright units alined with the axis of the cam, arms turnable on the trunnions and extending forwardly in converging relation to a rigid connection with the boom, and a rigid transverse strap connected at its ends to the arms adjacent their rear end and extending across and connected to the adjacent portion of the boom; the latter being disposed in a transverse plane between the upright units and the shaker rod being below the boom.

References Cited in the file of this patent

UNITED STATES PATENTS 2,685,775    Gould et al. _____ Aug. 10, 1954
2,804,743    Gould et al. _____ Sept. 3, 1957